(12) United States Patent
Siengchum et al.

(10) Patent No.: US 9,902,615 B2
(45) Date of Patent: Feb. 27, 2018

(54) SYNGAS PRODUCTION VIA CYCLIC REDUCTION AND OXIDATION OF METAL OXIDES

(71) Applicant: The Babcock & Wilcox Company, Barberton, OH (US)

(72) Inventors: Tritti Siengchum, Akron, OH (US); Luis G Velazquez-Vargas, Copley, OH (US); Thomas J Flynn, North Canton, OH (US); Douglas J DeVault, Rootstown, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 148 days.

(21) Appl. No.: 14/799,559

(22) Filed: Jul. 14, 2015

(65) Prior Publication Data
US 2017/0015554 A1    Jan. 19, 2017

(51) Int. Cl.
*C10J 3/00*    (2006.01)
*C01B 3/36*    (2006.01)
(Continued)

(52) U.S. Cl.
CPC ............... *C01B 3/36* (2013.01); *C01B 3/061* (2013.01); *C01B 3/08* (2013.01); *C01B 3/344* (2013.01); *C01B 2203/0216* (2013.01); *C01B 2203/0811* (2013.01); *C01B 2203/0838* (2013.01); *C01B 2203/1241* (2013.01); *C10J 3/725* (2013.01); *Y02E 60/36* (2013.01)

(58) Field of Classification Search
CPC ........................................................ C10J 3/725
See application file for complete search history.

(56) References Cited

U.S. PATENT DOCUMENTS

| 3,442,619 | A | * | 5/1969 | Schora, Jr. | ............. | C01B 3/061 |
| | | | | | | 423/658 |
| 3,503,724 | A | * | 3/1970 | Benson | .................. | C01B 3/061 |
| | | | | | | 423/418.2 |

(Continued)

*Primary Examiner* — Matthew J Merkling
(74) *Attorney, Agent, or Firm* — Michael J. Seymour (57) ABSTRACT

A chemical-looping system utilizes oxygen-carrier particles to produce syngas from carbonaceous fuels. The system provides a circuitous flow path for the oxygen-carrier particles, which are used to partially oxidize the fuel to produce syngas. The circuitous flow path can proceed through a plurality of unit operations, including a reducer, a conversion reactor, an oxidizer, and a combustor. The conversion reactor is designed to partially oxidize carbonaceous fuel in co-current flow with the oxygen-carrier particles to produce syngas. In embodiments including an oxidizer, the oxidizer is designed to at partially re-oxidize the carrier particles, yielding hydrogen that can be mixed with partially oxidized products from the conversion reactor to adjust syngas quality. The combustor can be used to fully oxidize the carrier particles traveling in a closed loop. Reactions carried out in the combustor are highly exothermic and yield thermal energy that is absorbed by the carrier particles. The absorbed energy is used at other parts of the process, including the conversion reactor, to drive endothermic reactions. In this manner the system can be operated autothermally or nearly so. Methods of producing syngas are also disclosed.

20 Claims, 3 Drawing Sheets

(51) Int. Cl.
*C01B 3/08* (2006.01)
*C10J 3/72* (2006.01)
*C01B 3/06* (2006.01)
*C01B 3/34* (2006.01)

(56) References Cited

U.S. PATENT DOCUMENTS

| | | | | |
|---|---|---|---|---|
| 3,615,298 | A * | 10/1971 | Benson | C01B 3/061 423/658 |
| 3,619,142 | A * | 11/1971 | Johnson | C01B 3/063 422/139 |
| 2009/0020405 | A1 * | 1/2009 | Fan | B01J 19/00 201/12 |
| 2011/0176968 | A1 * | 7/2011 | Fan | C10J 3/12 422/139 |
| 2011/0303875 | A1 * | 12/2011 | Hoteit | C01B 3/42 252/373 |
| 2012/0159841 | A1 * | 6/2012 | Fan | C10G 2/50 44/457 |
| 2013/0118076 | A1 * | 5/2013 | Guillou | C10G 1/047 48/110 |
| 2013/0143167 | A1 * | 6/2013 | Proell | B01J 8/0055 431/7 |
| 2013/0149650 | A1 * | 6/2013 | Gauthier | C10J 3/725 431/7 |

* cited by examiner

SYNGAS PRODUCTION VIA CYCLIC REDUCTION AND OXIDATION OF METAL OXIDES

BACKGROUND

Synthesis gas (syngas) is composed primarily of carbon monoxide and hydrogen. It is used as an intermediate feedstock in numerous industrial processes for producing various hydrocarbons (for example methanol), and as a source of hydrogen. Various processes exist for producing syngas from carbonaceous fuels, such as steam reforming and partial oxidation of natural gas.

Chemical-looping processes also can be used to produce syngas from carbonaceous fuels. In such processes metal-oxide particles are oxidized and reduced in a closed-loop cycle, wherein at one point in the cycle the particles are reduced in the partial oxidation of a carbonaceous fuel to yield syngas products. Examples of chemical-looping processes are chemical looping combustion, chemical looping gasification, and chemical looping partial oxidation.

In chemical looping combustion, which can be configured for power generation, metal-oxide particles react with a fuel to produce carbon dioxide and steam, resulting in reduction of the metal-oxide particles. The carbon dioxide and steam produced in the fuel reactor are easily separable, which allows for sequestration of carbon dioxide. The reduced metal-oxide particles are then regenerated with an oxidant such as air and recycled back to the fuel reactor. The regeneration of the metal-oxide particles is a highly exothermic process and the heat produced can be used for power generation.

In chemical looping gasification, which can be configured to produce hydrogen, metal-oxide particles react with a fuel to produce carbon dioxide, carbon monoxide, hydrogen and steam, again resulting in reduction of the metal-oxide particles. The reduced metal-oxide particles are regenerated in two steps. In the first step, steam partially oxidizes the reduced metal-oxide particles while producing hydrogen. In the second step, the partially re-oxidized metal-oxide particles are further oxidized with an oxidant such as air and recycled back to the fuel reactor.

Chemical looping partial oxidation uses metal-oxide particles to oxidize carbonaceous fuels (e.g. natural gas, which is primarily methane) to produce syngas.

These processes are referred to as 'chemical looping' because the metal-oxide particles in each process are recycled and reused continuously in a closed-loop pathway in the system. That is, the metal-oxide particles first are reduced in order to oxidize another reactant in a reactor, and the spent or partially spent (i.e. reduced) metal-oxide particles from the reactor are then re-oxidized in another part of the process before being redirected back to the reactor to be used again. Improved chemical-looping processes to produce syngas are of significant commercial interest.

SUMMARY OF THE INVENTION

A chemical-looping system with unit operations is disclosed. In the system, a metal oxide is reacted with a carbonaceous fuel used to produce syngas. Advantageously, the carbonaceous fuel can be one or more gaseous hydrocarbon fuels including but not limited to natural gas (which is a mixture of lower alkanes comprising predominantly methane), methane, ethane, propane or butane. The metal oxide can be part of oxygen-carrier particles, which can also include an inert material with high heat capacity and can absorb heat produced in one unit operation and carry the heat to subsequent unit operations.

One unit operation, the reducer, is preferably a counter-current reactor. A fuel and oxygen-carrier particles are fed to the reactor, where the oxygen-carrier particles oxidize the fuel to produce an oxidized product and reduced oxygen-carrier particles. The fuel is preferably a carbonaceous fuel, which reacts with the oxygen-carrier particles to produce carbon dioxide and steam. In the absence of molecular oxygen, the reactions in the reducer are endothermic.

Another unit operation, the fuel-conversion reactor, is preferably a co-current reactor. A carbonaceous fuel and oxygen-carrier particles are fed to the conversion reactor, where the oxygen-carrier particles partially oxidize the carbonaceous fuel to produce carbon monoxide and hydrogen as well as reduced oxygen-carrier particles. Steam can optionally be fed to the conversion reactor to react with the carbonaceous fuel to produce carbon monoxide and hydrogen. Carbon dioxide also can optionally be fed to the conversion reactor to react with solid carbonaceous fuels to facilitate the production of carbon monoxide and hydrogen. In the absence of molecular oxygen, the reactions in the conversion reactor are endothermic. Further information regarding chemical looping processes for partial oxidation of carbonaceous fuels may be obtained from Velazquez-Vargas et al., United States Patent Application Publication No. US2014/0275297 A1, published Sep. 18, 2014, which is incorporated herein by reference in its entirety.

Another unit operation, the oxidizer, is preferably a countercurrent reactor. Steam and oxygen-carrier particles are fed to the oxidizer, where the steam oxidizes the oxygen-carrier particles to produce hydrogen and oxidized oxygen-carrier particles. Preferably, the product stream from the conversion reactor (i.e., carbon monoxide, hydrogen, reduced oxygen-carrier particles, etc.) is fed to the oxidizer. The countercurrent design of the oxidizer allows it to serve as a disengagement zone to separate gaseous products from oxygen-carrier particles. The reactions in the oxidizer are exothermic.

Another unit operation, the combustor, is a reactor where an oxidant and oxygen-carrier particles are fed to the reactor to produce oxidized oxygen-carrier particles and spent oxidant. The oxidant is preferably air. The reactions in the combustor are exothermic.

In a preferred embodiment, the unit operations are in the following order in the system: combustor, reducer, conversion reactor, oxidizer, combustor, etc. Thus, the unit operations are configured such that the exit of the reducer where the oxygen-carrier particles exit is in communication with the entrance of the conversion reactor where the oxygen-carrier particles enter; the exit of the conversion reactor where the oxygen-carrier particles exit is in communication with the entrance of the oxidizer where the oxygen-carrier particles enter; the exit of the oxidizer where the oxygen-carrier particles exit is in communication with the entrance of the combustor where the oxygen-carrier particles enter; and the exit of the combustor where the oxygen-carrier particles exit is in communication with the entrance of the reducer where the oxygen-carrier particles enter. Preferably, the communication between the exit of the combustor where the oxygen-carrier particles exit and the entrance of the reducer where the oxygen-carrier particles enter is provided by a riser. By "in communication with" it is meant that two unit operations are connected such that oxygen-carrier particles traveling through the system would exit the first unit operation and proceed to the entrance of the second unit operation before proceeding to any of the other unit operations. However, intermediary unit operations, including but not limited to heat exchangers and steam generators, for example, could be placed between two unit operations without being inconsistent with the term "in communication with."

In one aspect, a system is provided that includes a circuitous flow pathway for oxygen-carrier particles. The pathway proceeds through a plurality of unit operations including a reducer, a conversion reactor, and a combustor. The reducer is configured to at least partially reduce the oxygen-carrier particles. The conversion reactor is configured to react the oxygen-carrier particles with a carbonaceous fuel via co-current flow to yield incomplete-oxidation products that include carbon monoxide and hydrogen. The combustor is configured to receive the oxygen-carrier particles in a partially or fully reduced state and to fully re-oxidize the oxygen-carrier particles.

In a further aspect, a method of producing syngas is provided, which includes the following steps: flowing a stream of oxygen-carrier particles through a circuitous flow path that proceeds through a plurality of unit operations including a combustor, a reducer and a conversion reactor; in the combustor oxidizing oxygen-carrier particles in the stream via an exothermic chemical reaction such that thermal energy is generated thereby and is at least partially absorbed by the particles in the stream; in the reducer at least partially reducing oxygen-carrier particles in the stream thereby consuming at least a portion of the absorbed thermal energy; and in the conversion reactor contacting the oxygen-carrier particles in the stream with a carbonaceous fuel stream in co-current flow and reacting them to yield incomplete oxidation products that include carbon monoxide and hydrogen, thereby consuming an additional portion of the absorbed thermal energy.

In yet a further aspect, another method of producing syngas is provided, which includes the following steps: flowing a stream of oxygen-carrier particles through a circuitous flow path in which the oxygen-carrier particles: a) are oxidized via an exothermic chemical reaction such that thermal energy is generated thereby and is at least partially absorbed by the particles; b) thereafter, are at least partially reduced, thereby consuming at least a portion of the absorbed thermal energy; and c) thereafter, are contacted and reacted with a carbonaceous fuel stream in co-current flow to yield incomplete oxidation products that include carbon monoxide and hydrogen, thereby consuming an additional portion of the absorbed thermal energy.

The chemical looping systems and processes described herein generate reaction products that themselves are useful in other processes. Such systems and processes are more fully described and understood by reference to the detailed description set forth below and the Figures of illustrative embodiments and the text that describes them herein.

These and other non-limiting aspects of the disclosure are more particularly described below.

BRIEF DESCRIPTION OF DRAWINGS

The disclosed systems and embodiments may take form in various components and arrangements of components, and in various process operations and arrangements of process operations. The drawings are only for purposes of illustrating preferred embodiments and are not to be construed as limiting. This disclosure includes the following drawings.

DETAILED DESCRIPTION OF PREFERRED EMBODIMENTS

A more complete understanding of the components, processes and apparatuses disclosed herein can be obtained by reference to the accompanying drawings. These figures are merely schematic representations and are, therefore, not intended to indicate relative size and dimensions of the represented unit operations or components thereof and/or to define or limit the scope of the exemplary embodiments.

Although specific terms are used in the following description for the sake of convenience, such terms are not intended to define or limit the scope of the disclosure. In the drawings and the description below, it is to be understood that like numeric designations refer to components of like function.

The singular forms "a," "an," and "the" include plural referents unless the context clearly dictates otherwise.

All ranges disclosed herein are inclusive of the recited endpoint and independently combinable (for example, the range of "from 2 inches to 10 inches" is inclusive of the endpoints, 2 inches and 10 inches, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

To the extent that explanations of certain terminology or principles of the chemical looping arts, systems, processes, and related arts may be necessary to understand the present disclosure, the reader is referred to Steam/its generation and use, 40th Edition, Stultz and Kitto, Eds., Copyright 1992, The Babcock & Wilcox Company, and to Steam/its generation and use, 41st Edition, Kitto and Stultz, Eds., Copyright 2005, The Babcock & Wilcox Company, and Steam/its generation and use, 42nd Edition, G. L. Tomei, Ed., Copyright 2015, The Babcock & Wilcox Company, the texts of which are hereby incorporated by reference as though fully set forth herein.

As used herein, the quality of syngas refers to a molar ratio of $H_2$ to CO as well as a desirably low concentration of $CO_2$ (if present) that is useful for making a particular product, for example MeOH, EtOH, diesel fuel, gasoline, etc. The desired quality of the syngas also depends on the requirements for downstream processing.

In some embodiments, the processes and systems can produce $H_2$ in a separate step or reaction, and that $H_2$ can be combined with CO from the fuel conversion process to provide syngas which, in turn, can be used to produce organic fluids (e.g., fuels and chemicals) using techniques such as a Fischer-Tropsch (F-T) process.

In the chemical-looping systems described herein, oxygen-carrier particles serve as a source of oxygen to oxidize carbonaceous fuels, e.g. to produce syngas. They are made up of or include at least one metal oxide. The oxidation state of the metal oxide in the particles varies as they travel through the system. The term 'metal oxide' as used herein when referring to particles or to the material of or in a particle includes the fully reduced elemental metal, on the understanding that at another point in the system the metal will be re-oxidized to once again be a true metal oxide. In addition to metal oxide, preferably the oxygen-carrier particles also include an inert support material; preferably one having a significant heat capacity effective to absorb heat generated in one part of the chemical-looping system and carry it to another part of the system. In this manner the traveling particles can supply energy for the endothermic reactions as hereafter described. For example, the particles gain thermal energy by absorption of at least a portion of the energy evolved during re-oxidation of the metal-oxide particles in a different part of the process. Such re-oxidation reactions are highly exothermic and evolve a good deal of heat. Also as used herein, the oxidation or reduction of oxygen-carrier particles refers to the oxidation or reduction of the metal-oxide(s) in those particles, and not necessarily of other compounds in those particles, for example inert support materials such as ceramic materials.

Using metal oxygen carriers as a source of oxygen has advantages over using pure oxygen, which requires an air separation unit and therefore adds undesirable cost to the process. The following properties can be taken into consideration when determining the metal-oxide material and inert-support material to be used in a particular system: heat capacity, density, strength, size and shape, pore size and total surface area (internal and external), oxygen-transfer capacity, reaction kinetics, $CO_2$-capture ability, catalytic effects, sulfur tolerance, coking tolerance, other pollutant resistance, flow properties, agglomeration, and angle of repose.

The metal oxide can be chosen from oxides of, for example, including but not limited to, iron, copper, nickel, cobalt, cerium, bromine, calcium and ruthenium, including one or any combination of these. The metal oxide can be represented by the formula $MO_x$, where M is a metal, O is oxygen, and x can be zero or any positive value corresponding to available oxidation states of the metal, M. The metal oxide can constitute any percentage of the oxygen-carrier particles, but preferably constitutes from 1.5% to 50% (by weight) of the oxygen-carrier particles, more preferably 10% to 40% by weight, and most preferably 15% to 30% by weight.

The preferred metal oxide in the oxygen-carrier particles in the disclosed systems and methods is based on iron, because of the multiple oxidation states of iron and because it is inexpensive and non-hazardous. The predominant oxidation states of iron are exemplified in iron (III) oxide ($Fe_2O_3$), iron (II) oxide (FeO), iron (II/III) oxide ($Fe_3O_4$) and elemental iron (Fe). Iron (II) oxide (FeO) is often an iron deficient compound such as $Fe_{0.947}O$. As discussed below, iron oxide can cycle through several or all of the aforementioned oxidation states at different points in the chemical-looping process. Thus, the iron oxide can be represented by the formula $FeO_x$, wherein x preferably varies from 0 to 1.5. When x is 0, this signifies that the iron oxide in the referenced particles is in the form of elemental iron (Fe). When x is 1.5, this signifies that the iron oxide in the referenced particles is in the form of iron (III) oxide ($Fe_2O_3$).

The inert support material can be chosen based on inertness in the atmospheres and under the reaction conditions to be encountered in a particular system, as well as on the heat capacity of the material given the amount of thermal energy it is desired that they will transport in the system. Candidate materials include, but are not limited to, for example, oxides of aluminum, titanium, silicon and vanadium, as well as carbides of iron, titanium and silicon, again including one or any combination of these. A preferred inert support material in the oxygen-carrier particles described here is aluminum oxide ($Al_2O_3$).

The oxygen-carrier particles may also be doped with other agents to modify the rate-of-reaction kinetics. Such dopants could be chosen from, for example, including but not limited to, elements such as potassium, sodium, rubidium, magnesium, copper, iron, nickel, calcium, ruthenium, manganese, lithium, aluminum, titanium, silicon, chromium, cobalt, vanadium, germanium, arsenic, phosphorus, sulfur, selenium, cerium, bromine and indium, as well as oxides of such materials, again including one or any combination of these. Preferred dopants for the oxygen-carrier particles include calcium oxide (CaO), copper (Cu), and cerium (Ce), as well as mixtures of these materials. Some formulations of metal oxides including the metal oxide, the support material and the dopant(s) specifically promote the release of oxygen atoms to facilitate the oxidation of the carbonaceous fuel. These formulations are often referred to as chemical looping oxygen uncoupling materials or CLOU materials, as known in the art.

In preferred embodiments, chemical-looping systems disclosed herein include at least the following unit operations connected in series in a loop that defines a circuitous flow path for oxygen-carrier particles through the system: a reducer where fully oxidized oxygen-carrier particles are partially reduced in countercurrent flow relative to the gas traveling through the unit; a fuel-conversion reactor where the partially reduced oxygen-carrier particles from the reducer partially oxidize a carbonaceous fuel to produce syngas in co-current flow relative to the gas traveling through the unit; an oxidizer where reduced oxygen-carrier particles from the conversion reactor are at least partially re-oxidized with steam to produce hydrogen, wherein the hydrogen is mixed (in the oxidizer unit) with syngas from the conversion reactor to produce a higher- or adjusted-quality syngas in countercurrent flow relative to the gas traveling through the unit; and a combustor where the partially oxidized oxygen-carrier particles from the oxidizer are fully re-oxidized and reheated, preferably to their highest oxidation state and temperature, prior to being delivered back into the reducer to repeat the cycle in a continuous process. Each of these units will now be described in more detail.

First to be discussed is the reducer. One goal of the reducer is to partially reduce the oxygen-carrier particles so that the maximum possible thermal energy can be generated in the combustor via re-oxidation of those particles, which can then carry and deliver that energy to other, endothermic parts of the process. Another goal of the reducer is to partially reduce the particles so that on entering the conversion reactor they thermodynamically favor production of the incomplete-oxidation products carbon monoxide and hydrogen over carbon dioxide and steam. The goals of the reducer can be achieved by transferring chemical energy from a fuel to the oxygen-carrier particles via a redox reaction. The chemical energy of the oxygen carrier particles is stored in the form of a reduced oxidation state of the metal oxide in the particles.

The reducer reduces oxygen-carrier particles via oxidation of a fuel. As noted above, it preferably produces partially reduced oxygen-carrier particles and fully oxidized products from the fuel. Preferably, the fuel is a carbonaceous fuel such as natural gas or methane. More broadly, the carbonaceous fuel can be any fuel that contains primarily carbon and hydrogen, such as methane, ethane, and higher hydrocarbons. In desirable embodiments the fuel is methane or predominantly methane (e.g., as in natural gas). The fully oxidized products of such fuels primarily comprise carbon dioxide and steam. These complete-oxidation products are preferred in the reducer rather than partially oxidized products such as carbon monoxide and hydrogen. Complete oxidation of the fuel in the reducer ensures the most efficient partial reduction of the oxygen-carrier particles. Complete oxidation to carbon dioxide and steam reduces the oxygen-carrier particles further per mole of fuel than partial oxidation to carbon monoxide and hydrogen. Accordingly, complete oxidation achieves the goals of the reducer more efficiently than incomplete oxidation. The reactions that occur in the reducer are endothermic and thus require heat to proceed. Preferably, the heat necessary for these reactions is provided from the oxygen-carrier particles themselves, which preferably enter the reducer carrying thermal energy absorbed from a prior exothermic reaction, which the particles can deliver to the reactions in the reducer in the form of sensible heat. Alternatively, heat can be provided to the reducer by other means such as burning fuel with oxygen or air, or by introducing a reheating unit operation to heat up the particles before entering the reducer.

Those skilled in the art will appreciate that although preferred embodiments mention various types of gaseous fuels, other hydrocarbon fuel sources might be used, including solids such as pulverized coal, which can be suspended in a gas-flow to be contacted and reacted with the metal oxide as described herein. One skilled in the art can appreciate that the processes disclosed herein can be modified to accept other fuel sources, including, but not limited to, coal char, biomass, and waste or recycle streams.

Those skilled in the art will appreciate that although preferred embodiments mention various types of reactors, such reactors can be any of a variety of designs, non-limiting examples of which include moving or fixed bed reactors, one or more fluidized bed reactors (such as bubbling, slugging circulating or pressurized), rotary kiln, reactors having integral heat transfer surface for selective heating or cooling, and the like.

The reducer is preferably a countercurrent reactor, such as a countercurrent moving packed-bed reactor wherein the oxygen-carrier particles constitute the moving packed bed, which flows in a direction opposite the predominating direction of the gas flow. The gas stream flowing through the reducer begins as a stream of fuel such as natural gas. As it is oxidized in the reactor the gas stream is converted into gaseous oxidation products, preferably steam and carbon dioxide as noted above. Countercurrent flow favors complete oxidation of the fuel to carbon dioxide and steam. This is because in a countercurrent configuration the mixed gases continually encounter fresh, more highly oxidized oxygen-carrier particles as the gases continue along their path through the reducer, promoting greater oxidation of the gaseous products. In addition to transferring chemical energy from fuel to oxygen-carrier particles, the reducer also serves the purpose of providing separation between the spent gaseous oxidant stream and the oxidized oxygen-carrier particles that leave the combustor together as a single mixed gas/fluidized-solid stream so that most of the spent gaseous oxidant is diverted and does not enter the conversion reactor with the oxygen-carrier particles. The separation of spent oxidant gas from the mixed stream entering the reducer carrying the oxygen-carrier particles is achieved because of the pressure drop across the reducer. Operation of the reducer as a countercurrent moving packed-bed reactor provides a sufficient pressure gradient that decreases in the direction toward where the mixed-phase stream enters the reducer (as a result of countercurrent gaseous flow) so that gaseous oxidized products are driven to exit the reducer adjacent that location rather than flow against the gradient. In this mode of operation the fresh carbonaceous fuel is injected into the reducer at a location remote from where the mixed-phase stream enters, nearer to where the partially-reduced particles will exit. As a result the gas carrying the partially-reduced particles from the exit of the reducer into the conversion reactor comprises primarily unoxidized fuel and partially-oxidized products.

The conversion reactor, which preferably receives the partially reduced oxygen-carrier particles from the reducer, produces carbon monoxide and hydrogen from the partial oxidation of a carbonaceous fuel with those particles. In addition to hydrogen and carbon monoxide, the complete-oxidation products steam and carbon dioxide may also be produced in the conversion reactor as undesired side products. In addition to the carbonaceous fuel, steam can be fed to the conversion reactor both as an oxidant for the fuel as well as a source of additional hydrogen. Steam addition can also serve to inhibit coke formation on the surface of the oxygen-carrier particles. The carbon monoxide-to-hydrogen ratio, as well as maintenance of low $CO_2$ concentration, and thus the quality of the syngas, can be adjusted by the amount of steam fed to the conversion reactor. The reactions that occur in the conversion reactor are endothermic and thus require heat to proceed. Preferably, the heat necessary for those reactions is supplied from the oxygen-carrier particles, which are at elevated temperature and carry thermal energy upon entry into the conversion reactor, which they deliver to facilitate the redox reactions in that reactor in the form of sensible heat.

The fuel-conversion reactor is configured as a co-current reactor, namely a co-current moving packed-bed reactor, wherein the oxygen-carrier particles constitute the moving packed bed. In contrast to the reducer, in the conversion reactor, the oxygen-carrier particles flow in a direction co-current with the predominating direction of the gas flow. A co-current flow also can be approximated by a fluidized or bubbling bed in which the flow of both metal oxide particles and fuel can accompany one another in the same direction as they move in an essentially the same direction (i.e. parallel to one another) through the conversion reactor. A generally co-current flow pattern is one where the overall flow of most of the gaseous components is in the same direction as the overall flow of the solids. This is in contrast to a counter-current flow path where metal oxide particles flow in the opposite direction of the fuel (e.g., metal oxide particles flow downward, while the fuel or gas flows upward). The gas flow stream in the conversion reactor begins predominantly as fuel that is injected adjacent the end of the conversion reactor where the oxygen-carrier particles enter. As the fuel in the gas stream is oxidized it is converted into the partial-oxidation products carbon monoxide and hydrogen, still flowing co-currently with the moving packed bed of oxygen-carrier particles. As the fuel becomes partially oxidized, the carrier particles moving with the gas stream become further reduced. Using a co-current reactor configuration favors the production of incomplete-oxidation products over fully oxidized products. As the particles proceed through the conversion reactor, the oxygen-carrier particles react with the gaseous fuel to produce the incomplete-oxidation products carbon monoxide and hydrogen resulting in further-reduced oxygen-carrier particles. The reduction of the oxygen-carrier particles decreases the amount of oxygen available in the particles to carry out further oxidation of fuel-oxidation products.

In desirable embodiments, for example, the oxygen-carrier particles include $FeO_x$ as the oxidizing species, wherein on entering the conversion reactor x is on average between 0.8 and 1.3 for the particles, whereas on exiting the conversion reactor x is on average less than 0.8. Thus, as can be seen, as the particles progress through the conversion reactor in co-current flow with the gaseous materials, their oxidative capacity becomes diminished just as the degree of oxidation in the gases increases because the oxygen-carrier particles remain in contact with substantially the same gas. Therefore, after the oxygen-carrier particles react with the fuel to produce carbon monoxide and hydrogen, the particles' oxidative capacity becomes diminished just as partial oxidation products are produced, thus minimizing the overall driving force for further oxidation. Since the particles are in contact with substantially the same portion of the gases, there is little oxidative capacity for the oxygen-carrier particles to further oxidize the carbon monoxide and hydrogen to carbon dioxide and steam. Thus, in the co-current conversion reactor little to substantially no syngas produced therein (composed primarily of carbon monoxide and hydrogen) is further oxidized to carbon dioxide and steam. The conversion reactor preferably operates in the temperature range of 600° C. to 1400° C. and in the pressure range of 1 bar to 200 bars, and most preferable at 800° C. to 1100° C. and 1 bar to 2 bars.

The oxidizer produces hydrogen by using steam to at least partially re-oxidize reduced oxygen-carrier particles. The oxidizer is preferably a countercurrent reactor, such as a countercurrent moving packed-bed reactor similar to the reducer, but wherein steam instead of carbonaceous fuel enters from an end of the reactor opposite where the oxygen-carrier particles enter, carried predominantly by syngas when delivered directly from the conversion reactor. Similarly to the reducer, countercurrent flow favors more complete oxidation in the oxidizer in this reactor; in this case, the oxidizer is steam and the product is hydrogen gas. The hydrogen produced in the oxidizer can be utilized in many ways, including combining it with the syngas produced in the conversion reactor to adjust its quality, thereby making it more suited to produce particular hydrocarbon products having desired syngas quality.

In a preferred embodiment, the oxidizer follows the conversion reactor in the looping system relative to the closed-loop pathway of the oxygen-carrier particles in that process. In other words, oxygen-carrier particles and gaseous products that leave the conversion reactor proceed directly to the oxidizer, preferably in a single mixed-phase stream, before encountering any of the other aforementioned units in the loop defining the oxygen-carrier particle flow path. As noted, all the products from the conversion reactor (syngas and oxygen-carrier particles) preferably are fed to the oxidizer in a mixed stream of solid carrier particles entrained in the syngas generated in the conversion reactor. As discussed above, the conversion reactor is preferably co-current, which results in both the syngas and the oxygen-carrier particles existing and flowing together at the end of the gas-flow pathway in the conversion reactor. When this mixed stream is fed from the conversion reactor to the countercurrent moving packed-bed oxidizer, countercurrent operation of the oxidizer yields a separation between gaseous products and the solid oxygen-carrier particles in that stream. This separation is based on the pressure gradient that decreases in a direction toward where that stream enters, similarly as described above for the reducer.

This separation can be most efficient when the oxidizer is configured such that the mixed stream from the conversion reactor enters at or near the top of the oxidizer such that the mixed stream is initially flowing downward, in or approximating the direction of gravity. In this manner the oxygen-carrier particles will continue to flow in the substantially same direction aided by gravity even as the gaseous component of the original mixed-stream entering the oxidizer is diverted. In particular, the steam introduced to the oxidizer to partially re-oxidize the oxygen-carrier particles, thereby producing hydrogen, preferably enters the oxidizer at a location below where the aforementioned mixed stream enters, preferably at or near the bottom of the oxidizer, such that the gas stream flows upward, against the force of gravity and in a substantially opposite direction relative to the oxygen-carrier particles (i.e., a countercurrent flow pattern). In this manner, gravity acts on the solid particles to help them follow a path through the oxidizer against the countercurrent flow of gas therein. Conversely, the upward flow of gas (starting as steam but converted at least partly to hydrogen on exiting the oxidizer) impinges the mixed stream upon entering the oxidizer, thereby redirecting at least a substantial portion of the entering syngas (mixed with hydrogen generated in the oxidizer) to a syngas exit port at or near the top of the oxidizer. In this embodiment the pressure gradient acting to direct the upward flow of gas out the syngas exit port will have a stronger effect on entering syngas (thus redirecting its flow) than gravity. If necessary the desirable pressure balance can be promoted by adding a sealing gas, such as nitrogen, in the line exiting the oxidizer. As a result, this is an effective mechanism to achieve gas-solid separation between the moving packed bed of particles and the syngas in which they were entrained on entering the oxidizer. In this manner, the syngas exiting through the gas port at one end (preferably the upper end) of the oxidizer will contain little to no solid oxygen-carrier particles entrained therein, and at the same time little to no syngas will exit with the (partially re-oxidized) oxygen-carrier particles at the other end of the oxidizer. This results in little to no oxygen-carrier particles leaving the oxidizer with the gaseous products and little to no gaseous products leaving the oxidizer with carrier particles, yielding a more efficient system.

Another advantage of feeding all the products from the conversion reactor to the oxidizer in a single mixed-phase stream is that the gaseous products that exit the oxidizer will contain both the syngas produced in the conversion reactor and hydrogen produced in the oxidizer. By adjusting the operating parameters of the oxidizer to regulate the rate of hydrogen production therein, the quality of exiting syngas can be controlled to produce a desired $H_2$:CO ratio in the syngas. This is a higher-efficiency process for controlling the quality of syngas, directly within the chemical-looping system, than feeding syngas produced in that system to subsequent or remote unit operations to combine the syngas produced in the conversion reactor with hydrogen from another unit. Here, the oxidizer itself is part of and partially defines the closed loop traveled by the oxygen-carrier particles, and serves the dual purpose of separating syngas for elution from the system and combining with hydrogen to adjust its quality in a single operation.

The reactions occurring in the oxidizer are exothermic, thus producing heat. Preferably, this heat is absorbed by the oxygen-carrier particles and carried to subsequent operations.

The combustor is a reactor preferably comprising a bubbling fluidized-bed (BFB) combustion zone, followed by a transport reactor or riser. The combustor oxidizes oxygen-carrier particles using an oxidant, which is fed to the combustor separately. In the combustor, oxidant and reduced oxygen-carrier particles react to produce (preferably fully-) oxidized oxygen-carrier particles and spent oxidant. The reactions that occur in the combustor are highly exothermic. The oxygen-carrier particles can absorb the heat produced, and act as carriers of thermal energy into the other units in the looping system where endothermic reactions occur (namely the reducer and conversion reactor) to facilitate those reactions without the necessity to introduce heat from external sources. Although the reactions occurring in the oxidizer are also exothermic, and therefore produce heat that can be absorbed by the oxygen-carrier particles, the reactions that occur in the oxidizer typically are less exothermic than the reactions that occur in the combustor because the oxidant selected for use in the oxidizer (for example the oxygen from air) yields far more heat when oxidizing the oxygen-carrier particles than the steam used in the oxidizer to produce hydrogen. Also the fraction of the reduced oxygen-carrier particles that is oxidized with steam is less than in the combustor. Therefore the heat released is correspondingly lower, so the heat of reaction is lower and the converted fraction is lower. Thus, utilizing a system with a combustor and an oxidizer as described herein generates more heat that can be absorbed and carried by the carrier particles and used to promote endothermic reactions than a system with an oxidizer alone.

As noted above the oxidant used in the combustor is one that will effectively fully re-oxidize the oxygen-carrier particles to their highest oxidation state, and preferably one that will yield a highly exothermic reaction to do so. Preferably the oxidant is oxygen; for example the oxygen in air as already stated. Air is preferred due to its ease of use and availability.

If the oxygen-carrier particles that enter the reducer and conversion reactor carry sufficient thermal energy, the particles can provide all of the necessary energy to drive the endothermic reactions in these reactors without adding heat from an external source. This feature of the chemical-looping system described herein can allow the system to be autothermal or nearly autothermal. To ensure the most efficient autothermal operation, it is desirable for the oxygen-carrier particles to leave the combustor storing as much thermal energy (which can be delivered to other reactors as sensible heat to facilitate reactions therein) as possible.

Because the oxidation of oxygen-carrier particles is exothermic, one way to maximize the heat generated in the combustor is to maximize the amount of oxidation of the oxygen-carrier particles that occurs in that unit. In order to maximize oxidation, the particles that are fed to the combustor should be in as highly a reduced state as possible. When present in a particular chemical-looping system, the aforementioned reducer results in particles that are more highly reduced when they enter the combustor than in a system having no reducer. Although reduction reactions that occur in the reducer are endothermic, they are less endothermic per mole of metal atoms in the oxygen-carrier particles than the oxidation reactions in the combustor are exothermic. This can be seen through reference to the respective heats of reaction for typical reactions carried out in the units described herein, which are summarized below based upon methane as the carbonaceous fuel and iron (III) oxide as the fully oxidized metal oxide particle:

|  | Heat of reaction | Per Fe mole |
|---|---|---|
| Reducer reactions: | | |
| $CH_4$ (g) + $12Fe_2O_3$ → $CO_2$ (g) + $H_2O$ (g) + $8Fe_3O_4$ | 222.368 kJ @ 900° C. | (9.26 kJ) |
| $CH_4$ (g) + $4Fe_3O_4$ → $CO_2$ (g) + $H_2O$ (g) + $12FeO$ | 307.201 kJ @ 900° C. | (25.6 kJ) |
| Conversion reactor reactions: | | |
| $CH_4$ (g) + $3Fe_2O_3$ → CO (g) + $2H_2$ (g) + $2Fe_3O_4$ | 159.692 kJ @ 900° C. | (26.6 kJ) |
| $CH_4$ (g) + $Fe_3O_4$ → CO (g) + $2H_2$ (g) + $3FeO$ | 254.459 kJ @ 900° C. | (84.8 kJ) |
| $CH_4$ (g) + FeO → CO (g) + $2H_2$ (g) + Fe | 247.50 kJ @ 900° C. | (247.5 kJ) |
| Oxidizer reactions: | | |
| $H_2O$ (g) + Fe → $H_2$ (g) + FeO | −21.700 kJ @ 900° C. | (−21.7 kJ) |
| $H_2O$ (g) + 3FeO → $H_2$ (g) + $Fe_3O_4$ | −28.660 kJ @ 900° C. | (−9.6 kJ) |
| Combustor reactions: | | |
| $O_2$ (g) + 2Fe → 2FeO | −540.933 kJ @ 900° C. | (−270 kJ) |
| $O_2$ (g) + 6FeO → $2Fe_3O_4$ | −554.852 kJ @ 900° C. | (−92.5 kJ) |
| $O_2$ (g) + $4Fe_3O_4$ → $6Fe_2O_3$ | −512.435 kJ @ 900° C. | (−42 kJ) |

The above-mentioned heats of reaction are for purposes of illustrating example reactions that can occur in the referenced unit operations and are not to be construed as limiting the disclosure. One skilled in the art would appreciate that one may obtain various heats of reaction by adding and subtracting individual reactions.

Based on the foregoing exemplary reactions, a system with a reducer to partially reduce oxygen-carrier particles in the looping system, which results in more highly reduced oxygen-carrier particles upon entering the combustor, generates more heat in the combustor than a similar system without the reducer.

Figure 1:
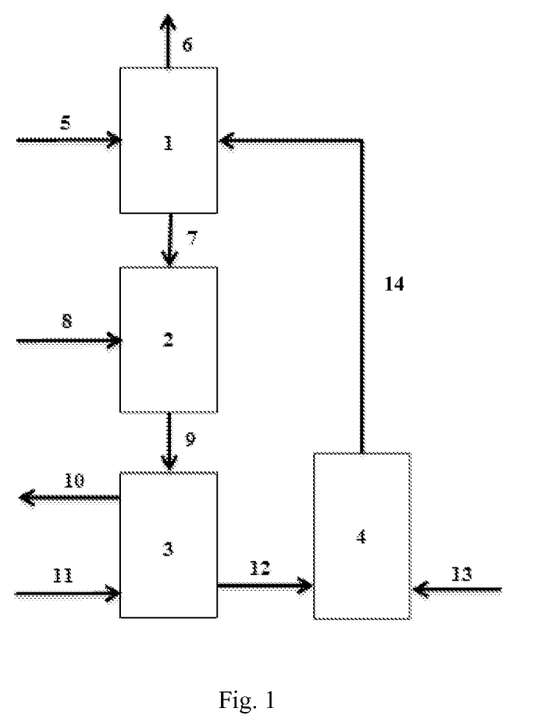
FIG. 1 is a schematic diagram of an example embodiment of a chemical-looping system for the production of syngas as herein disclosed.

In a preferred embodiment, the reducer 1 immediately follows the combustor 4 along the closed-loop pathway for the oxygen-carrier particles in the looping system as shown in the embodiment of FIG. 1. In other words, the oxygen-carrier particles that leave the combustor are fed directly to the reducer prior to encountering any of the other unit operations herein discussed. In this embodiment, the oxygen-carrier particles that are fed to the reducer are hot and contain metal oxides that are fully oxidized. The hot and fully oxidized particles are more reactive than cooler, less oxidized particles. More reactive particles in the reducer results in the reaction in that unit that favor complete oxidation of the fuel therein, thus producing carbon dioxide and steam as the primary carbon and hydrogen-based oxidation products rather than carbon monoxide and hydrogen.

Another way to produce additional heat in the system is by feeding a supplemental fuel and oxidant such as oxygen or air to the combustor in addition to the oxygen-carrier particles, which can be oxidized therein along with the particles. The oxidant in the combustor and the fuel will combust, yielding additional thermal energy. The resulting heat can be absorbed by the oxygen-carrier particles, yielding even greater thermal energy storage than from absorption of the heat of oxidation of the oxygen-carrier particles alone. Therefore, in a given looping system fuel can be added as needed or desired to provide additional thermal energy to the oxygen-carrier particles in order to deliver necessary or desirable heat to promote endothermic reactions in subsequent unit operations within the loop.

Yet another way to produce additional heat is by feeding additional fuel and oxidant (if needed) directly into the riser that delivers oxidized particles from the combustor to the next unit in the loop; preferably the reducer. This additional fuel will react with any excess oxidant in the riser, such as oxygen, to produce combustion products and heat. This heat can be absorbed by the oxygen-carrier particles and carried to subsequent, endothermic unit operations such as the conversion reactor and the reducer.

The system can be optimized to be operated autothermally (or near-autothermally depending upon heat loss) through judicious selection and optimization of the amount of fuel fed to the reducer, combustor, and/or riser to ensure that the oxygen-carrier particles carry sufficient heat from the highly exothermic oxidation reactions that occur in the combustor through to the conversion reactor where syngas is principally produced. By partially reducing the oxygen-carrier particles in the reducer, some thermal energy that might otherwise promote syngas production is consumed. But as noted above the net effect is that more thermal energy is generated in the overall system because the oxidation reactions in the combustor to re-oxidize the partially reduced oxygen-carrier particles yield more energy than is consumed in the reducer per mole of metal in the metal oxide of the oxygen-carrier particles. The thermal efficiency of the system is somewhat dictated by the size of the units (individual reactors described herein), as well. As the size of a unit increases, the surface-to-volume ratio for heat loss diminishes to a point where the heat loss through the surface is an insignificant percent of the total heat generated and therefore does not inhibit autothermal operation.

Optionally, streams entering the various reactors (e.g. the reducer, conversion reactor, and oxidizer) in a chemical-looping system can be preheated to increase efficiency in the associated reactor(s). For example, such streams can be preheated via heat exchangers that deliver heat from higher-temperature streams in the process; for example via a conventional countercurrent shell/tube heat-exchanger design where the 'hot side' is supplied with higher-temperature processing streams such as those (typically mixed-phase streams) eluting from reactors where exothermic reactions occur.

Referring to FIG. 1, a preferred configuration of the units already described is illustrated schematically. That is, the reducer 1 receives oxidized oxygen-carrier particles in stream 14 (Riser) and a carbonaceous fuel in stream 5. In reducer 1, the solid particles and gases flow countercurrent relative to one another, producing primarily carbon dioxide and steam that leave predominantly through stream 6, and partially reduced oxygen-carrier particles entrained in gas that leave through stream 7. Conversion reactor 2 receives the partially reduced oxygen-carrier particles in stream 7, and a carbonaceous fuel and optionally steam is/are delivered thereto via stream 8. The solid particles and gases flow co-current relative to one another and react to produce primarily carbon monoxide and hydrogen as oxidation products, yielding oxygen-carrier particles that are further reduced. Carbon dioxide and steam are potential side products resulting from the reactions, which will affect the quality of the produced syngas. All the gases and solid particles that enter conversion reactor 2 leave in mixed-phase stream 9. Oxidizer 3 receives the mixed-phase stream including carbon monoxide, hydrogen, carbon dioxide, and steam gases together with the reduced oxygen-carrier particles from stream 9. Steam is also delivered to the oxidizer via stream 11. The mixed-phase stream 9 enters the oxidizer 3 and flows in a direction countercurrent to the entering steam stream 11, wherein the steam from stream 11 partially re-oxidizes the reduced oxygen-carrier particles to produce hydrogen and partially oxidized oxygen-carrier particles, and also serves to separate the solids from the gases in that stream as already described. The generated hydrogen, any remaining unreacted steam, and carbon monoxide, hydrogen and carbon dioxide leave oxidizer 3 through stream 10. This is the syngas exit stream from the chemical-looping system. The quality of that stream can be adjusted as described above via the rate of hydrogen production in the oxidizer either to compensate for the proportion of carbon dioxide contamination in that stream or to adjust the quality of syngas to accommodate a particular downstream hydrocarbon-production process. The partially oxidized oxygen-carrier particles leave oxidizer 3 in stream 12 along with little to no gases. Combustor 4 receives reduced oxygen-carrier particles in stream 12, as well as an oxidant in stream 13. The oxidant re-oxidizes the oxygen-carrier particles preferably to a fully oxidized state, thus yielding spent oxidant gas. The spent oxidant and the fully oxidized oxygen-carrier particles leave the combustor 4 through stream 14 (e.g. via a riser as noted above) where they are recycled to the reducer 1 and the loop starts over. In reducer 1, the spent oxidant is separated from the full-oxidized particles and leaves through stream 6. Further downstream processing of the product streams leaving the overall system can occur depending on desired products and emissions, etc.

Figure 2:
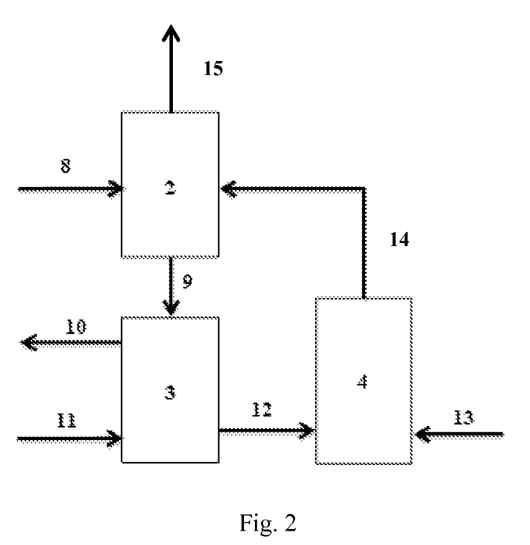
FIG. 2 illustrates another example embodiment of a chemical-looping system.

Referring now to FIG. 2, another embodiment is illustrated in which there is no reducer 1 as in FIG. 1. In this embodiment, the conversion reactor 2 receives partially or fully oxidized oxygen-carrier particles and spent oxidant directly from the combustor 4 via stream 14. The spent oxidant is separated from the oxygen-carrier particles and exits the system through stream 15. A carbonaceous fuel and optionally steam is/are delivered to the conversion reactor 2 via stream 8. The solid particles and gases flow co-current relative to one another in the conversion reactor 2 as described above and react to produce primarily carbon monoxide and hydrogen as well as partially reduced oxygen-carrier particles as in earlier embodiments. The oxidizer 3 operates as above, partially oxidizing oxygen-carrier particles delivered via stream 9 to yield hydrogen gas from the steam entering via stream 11, and substantially separating the gases from the flowing packed bed of oxygen-carrier particles. The gases (primarily syngas that is quality-adjusted via addition of hydrogen made in the oxidizer 3) elutes via stream 10 and the partially re-oxidized oxygen-carrier particles proceed to the combustor 4 via stream 12. Combustor 4 receives reduced oxygen-carrier particles in stream 12, as well as an oxidant in stream 13 as before. The oxidant re-oxidizes the oxygen-carrier particles preferably to a fully oxidized state and results in spent oxidant, again as before. If desired a supplemental fuel can be fed to the combustor 4 in this embodiment to react with the oxidant to produce combustion products and additional heat that can be absorbed by the oxygen-carrier particles. The spent oxidant and combustion products, and the fully oxidized oxygen-carrier particles leave through stream 14 (e.g. via a riser as noted above) where they are recycled to conversion reactor 2 and the loop starts over. Unlike the embodiment of FIG. 1, here there is no reducer to partially reduce oxygen-carrier particles prior to delivering them to the conversion reactor. As a result, those particles will have stronger oxidative capacity on entering the conversion reactor 2 compared to the embodiment of FIG. 1, which may result in the production of additional complete-oxidation side products compared to that embodiment. In addition, the particles may also be in a greater overall state of oxidation compared to the FIG. 1 embodiment on entering the combustor 4, which may result in lower heats of reaction from re-oxidizing the particles. Accordingly, in this embodiment it may be desirable to introduce additional supplemental fuel in the combustor 4 in order to yield a truly autothermal process.

EXAMPLE 1

The following example illustrates the operation of an embodiment of a chemical looping system as herein described. This example was carried out via a mathematical simulation. In this embodiment the chemical looping system is as illustrated and described above with respect to FIG. 1. All percentage concentrations and ppm/ppb concentrations in this example are by mole.

7,000 kg/hr of fuel is preheated to 232.2° C. The fuel simulates natural gas and therefore consists of 95.5% methane, 2.5% ethane, 0.5% propane, 0.2% butane, 0.9% carbon monoxide, 0.3% nitrogen, and 200 ppb sulfur. 5,600 kg/hr are fed to the reducer and the other 1,400 kg/hr are fed to the conversion reactor.

Also fed to the reducer are 1,900,000 kg/hr of oxidized oxygen-carrier particles. The particles consist of 10.1% iron (III) oxide and 89.9% aluminum oxide carrier. The particles are 1100° C.

The reducer produces about 27,219 kg/hr of combustion products at about 1100° C. The combustion products consist of 65.9% steam, 33.9% carbon dioxide, 0.1% nitrogen, 457 ppm oxygen, 10 ppm carbon monoxide, 9 ppm hydrogen, 1 ppm nitrogen oxide, 65 ppb sulfur dioxide, and trace amounts of methane, carbonyl sulfide, hydrogen cyanide, nitrogen dioxide, ammonium, nitric acid, sulfur, sulfur trioxide, and hydrogen sulfide.

The reducer reduces the oxygen-carrier particles to produce 1,878,380 kg/hr of partially reduced oxygen-carrier particles at about 1047° C. The partially-reduced oxygen-carrier particles consist of 83.3% aluminum oxide, 15.2% iron (II) oxide ($Fe_{0.947}O$), and 1.5% iron (II/III) oxide.

The 1,878,380 kg/hr of partially reduced oxygen-carrier particles are fed to the conversion reactor. In addition to the 1,400 kg/hr of fuel at 232.2° C. fed to the conversion reactor mentioned above, 37,000 kg/hr of fuel and 8,300 kg/hr of steam at about 648.9° C. are also fed to the conversion reactor. All the fuel consists of the same percentage makeup. The steam is 100% steam.

The conversion reactor produces 82,809 kg/hr of gaseous products and 1,842,270 kg/hr of reduced oxygen-carrier particles at 787.8° C. The gaseous products consist of 67.5% hydrogen, 27% carbon monoxide, 4.9% carbon dioxide, 0.5% steam, 951 ppm nitrogen, and 61 ppb hydrogen sulfide. The quality of syngas ($H_2/CO$ molar ratio) in the gaseous products is 1.962 which would be suitable for the production of methanol by additional downstream processes. The reduced oxygen-carrier particles consist of 81.5% aluminum oxide, 10% pure iron, 8.4% iron (II) oxide ($Fe_{0.947}O$), and 0.1% iron (II/III) oxide.

The 82,809 kg/hr of gaseous products and 1,842,270 kg/hr of reduced oxygen-carrier particles are fed to the oxidizer in addition to 4,900 kg/hr of pure steam at 593.9° C. The oxidizer produces 84,819.5 kg/hr of gaseous products and 1,845,160 kg/hr of partially oxidized oxygen-carrier particles at about 787° C. The gaseous products consist of 67.5% hydrogen, 26% carbon monoxide, 4.7% carbon dioxide, 1.7% steam, 917 ppm nitrogen, 59 ppb hydrogen sulfide, and trace amounts of oxygen. The quality of syngas in the gaseous products is 2.046.

The partially oxidized oxygen-carrier particles consist of 81.2% aluminum oxide, 9.9% iron (II) oxide ($Fe_{0.947}O$), and 8.9% pure iron and are fed to the combustor. Additionally, 270,000 kg/hr of air is fed to the combustor as an oxidant. Additionally, 800 kg/hr of steam is fed to the combustor. The combustor produces 1,900,000 kg/hr of oxidized oxygen-carrier particles that can be recycled to the reducer. The combustor also produced 216,962.244 kg/hr of spent oxidant. The spent oxidant consists of 96.1% nitrogen, 3.3% oxygen, 0.6% steam, 292 ppm nitrogen oxide, 871 ppb nitrogen dioxide, 9 ppb hydrogen,

EXAMPLE 2

A laboratory-scale experiment was performed to demonstrate the operation of the conversion reactor. The experiment was conducted on a laboratory-scale moving packed bed reactor. The conversion reactor section had a 1.8 inch inner diameter and 15 inchlength. Oxygen-carrier particles were made of iron-doped alumina (5-40 weight percent iron and of 2 mm nominal diameter) were loaded and held in a hopper at the top of the conversion reactor. The oxygen-carrier particle flow was controlled by a non-mechanical valve at the bottom of the reactor. The conversion reactor was placed inside a tubular furnace and heated to 950° C. at a heating rate of 50° C./min in flowing $N_2$ (1000 standard cm³/min). For the experiment, the inlet gas was switched from flowing $N_2$ to a mixture of $CH_4$ and $N_2$ (500-1000 standard cm³/min, 10-50 volume percent $CH_4$). The non-mechanical valve was operated to allow particle flow of 10 cm³/min. The residence time of particles in the heating zone was 10 min. Once steady-state was reached, the product gas was analyzed using a FTIR gas analyzer. The product gas composition was monitored as function of time. The conversion of $CH_4$ and yield of syngas components were calculated from these compositions.

Figure 3:
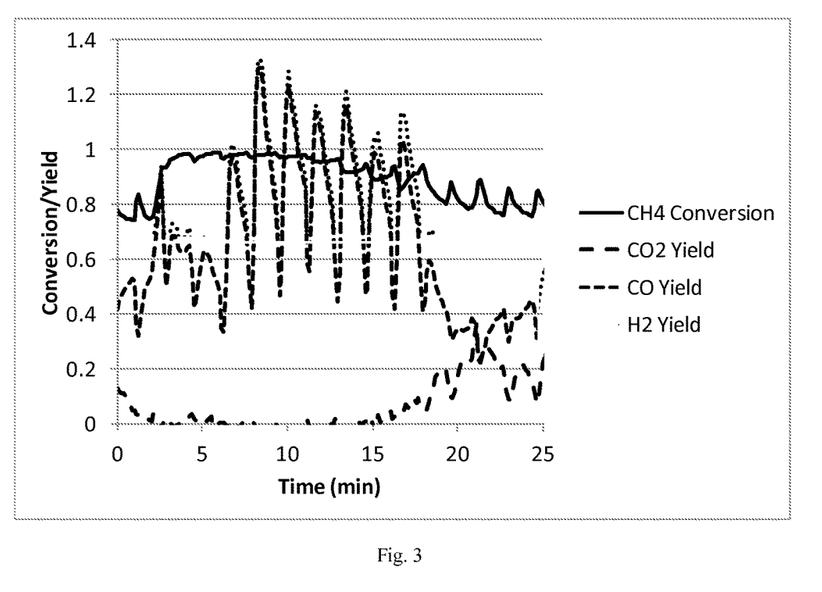
FIG. 3 shows methane conversion and product yields from a fuel-conversion reactor as herein described during an experiment described in Example 2 below.

The flow rates of partially reduced oxygen-carrier particles and methane as described above correspond to a stoichiometric ratio of $CH_4$ to oxidizing species in the particles representative of a desirable embodiment. The particles and the gases flow together downwards through the conversion reactor as in a co-current moving packed bed. FIG. 3 shows the methane ($CH_4$) conversion and the yield of carbon dioxide ($CO_2$), carbon monoxide ($CO$) and hydrogen ($H_2$) during the experiment. The methane conversion profiles indicate that full conversion of methane was achieved. Yield of $CO$ and $H_2$, which are the main constitutes of desirable syngas compositions, were as high as 100% and the yield of $CO_2$ was as low as 0%. These results show that high quality syngas can be achieved in the conversion reactor.

The systems depicted in FIGS. 1 and 2 are intended to illustrate in a non-limiting way to the ordinarily skilled artisan desirable embodiments of chemical looping systems. Many of the unit operations represented in these Figures are or can be adapted to be at least somewhat modular and, accordingly, the ordinarily skilled artisan can adapt one or more portions of the foregoing schematic representations for use in other processes or systems. Accordingly, combinations with other sub-systems are envisioned. For example, the embodiments disclosed herein may be applied to gas, chemical, liquid-fuel, and gas processing applications.

Although the invention has been described with respect to certain preferred embodiments, it is to be understood that the invention is not limited by the embodiments herein disclosed, which are exemplary and not limiting in nature, but is to include all modifications and adaptations thereto as would occur to the person having ordinary skill in the art upon reviewing the present disclosure, and as fall within the spirit and the scope of the invention as set forth in the appended claims.

The invention claimed is:

1. A method of producing syngas comprising:
   flowing a stream of oxygen-carrier particles through a circuitous flow path that proceeds through a plurality of unit operations comprising a combustor, a reducer, a conversion reactor, and an oxidizer;
   in said combustor oxidizing oxygen-carrier particles in said stream via an exothermic chemical reaction such that thermal energy is generated thereby and is at least partially absorbed by said particles in said stream;
   in said reducer at least partially reducing oxygen-carrier particles in said stream thereby consuming at least a portion of the absorbed thermal energy;
   in said conversion reactor contacting said oxygen-carrier particles in said stream with a carbonaceous fuel stream in co-current flow and reacting them to yield incomplete oxidation products comprising carbon monoxide and hydrogen, thereby consuming an additional portion of said absorbed thermal energy; and
   in said oxidizer at least partially re-oxidizing the oxygen-carrier particles in said stream using steam to yield hydrogen.

2. The method of claim 1, wherein partially or fully reduced oxygen-carrier particles from said conversion reactor and said incomplete oxidation products generated therein flow together in a single mixed-phase stream along said pathway from an exit of said conversion reactor to an entrance of said oxidizer, said steam flowing in a stream countercurrent to said mixed-phase stream in said oxidizer.

3. The method of claim 2, said stream of steam impinging said mixed-phase stream adjacent said entrance where said mixed-phase stream enters said oxidizer, thereby redirecting at least a portion of gases in said mixed-phase stream to an exit port of said oxidizer, wherein hydrogen generated in said oxidizer is combined with said gases prior to exiting said exit port.

4. The method of claim 3, wherein oxygen-carrier particles in said mixed-phase stream continue to flow against said countercurrent stream of steam as gases from said mixed-phase stream are redirected, thereby effecting a separation of said particles from gases in the mixed-phase stream.

5. The method of claim 1, said oxygen-carrier particles comprising iron oxide of the formula $FeO_x$, wherein x is between 0 and 1.5.

6. The method of claim 5, said oxygen-carrier particles further comprising one or a combination of an inert support material and/or doping agent selected from the group consisting of aluminum oxide, calcium oxide, copper, and cerium.

7. The method of claim 5, wherein x is between 0.8 and 1.3 on average for oxygen-carrier particles entering the conversion reactor.

8. The method of claim 7, wherein x is less than 0.8 on average for oxygen-carrier particles on exiting the conversion reactor.

9. The method of claim 8, said conversion reactor operating at a temperature of 600° C. to 1400° C.

10. The method of claim 5, said iron oxide being 1.5% to 50% by weight of the oxygen-carrier particles.

11. The method of claim 5, said iron oxide being 15% to 30% by weight of the oxygen-carrier particles.

12. The method of claim 1, wherein said reducer at least partially reduces said oxygen-carrier particles using a carbonaceous gaseous fuel, wherein said gaseous fuel and said oxygen-carrier particles flow countercurrent with respect to one another in said reducer.

13. The method of producing syngas of claim 1, said oxygen-carrier particles flowing cyclically via said circuitous flow pathway through said unit operations in the following order:
   from an exit of said combustor to an entrance of said reducer;
   from an exit of said reducer to an entrance of said conversion reactor;
   from an exit of said conversion reactor to an entrance of said oxidizer; and
   from an exit of said oxidizer to an entrance of said combustor.

14. The method of claim 13, said oxygen-carrier particles flowing from said exit of said combustor to said entrance of said reducer via a riser in which additional carbonaceous fuel is injected.

15. The method of claim 1, wherein endothermic reactions in said reducer are carried out using thermal energy stored in said oxygen-carrier particles that was absorbed from exothermic reactions in said combustor.

16. The method of claim 15, said method being autothermal such that upon entry into said combustor the oxygen-carrier particles are in a sufficiently reduced state, at least partially as a result of having been partially reduced in said reducer, that complete oxidation thereof in said combustor generates sufficient thermal energy to fully support the generation of incomplete oxidation products in the conversion reactor.

17. The method of claim 15, wherein a quantity of thermal energy absorbed by said oxygen-carrier particles in said combustor and in said oxidizer together is greater than of the thermal energy consumed in said reducer and said conversion reactor together.

18. The method of claim 12, said countercurrent flow yielding a pressure gradient that decreases in a direction toward a location where said oxygen-carrier particles enter the reducer so that gaseous oxidized products generated therein are driven to exit the reducer adjacent said location rather than flow against the gradient, wherein partially-reduced oxygen-carrier particles are carried from an exit of said reducer into said conversion reactor via a gas comprising primarily unoxidized fuel and partially-oxidized products.

19. A method of producing syngas comprising flowing a stream of oxygen-carrier particles through a circuitous flow path in which said oxygen-carrier particles:

a) are oxidized via an exothermic chemical reaction such that thermal energy is generated thereby and is at least partially absorbed by said particles;
b) thereafter are at least partially reduced, thereby consuming at least a portion of the absorbed thermal energy;
c) thereafter are contacted and reacted with a carbonaceous fuel stream in co-current flow to yield incomplete oxidation products comprising carbon monoxide and hydrogen, thereby consuming an additional portion of said absorbed thermal energy; and
d) thereafter are at least partially re-oxidized using steam to yield hydrogen, at least a portion of said hydrogen being combined with said incomplete oxidation products.

20. The method of claim 19, wherein said steps (a) through (d) are repeated at least once.

* * * * *